(12) United States Patent
Richardson et al.

(10) Patent No.: US 7,070,359 B2
(45) Date of Patent: Jul. 4, 2006

(54) MICROTUNNELING SYSTEMS AND METHODS OF USE

(75) Inventors: John G. Richardson, Idaho Falls, ID (US); Kevin M. Kostelnik, Idaho Falls, ID (US); Reva A. Nickelson, Shelley, ID (US); Paul A. Sloan, Rigby, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 174 days.

(21) Appl. No.: 10/850,706

(22) Filed: May 20, 2004

(65) Prior Publication Data

US 2005/0257959 A1    Nov. 24, 2005

(51) Int. Cl.
*E21B 4/00* (2006.01)

(52) U.S. Cl. .................... 405/141; 175/171; 175/94; 175/113; 405/184.4; 405/184.5

(58) Field of Classification Search ............ 175/24, 175/26, 27, 40, 61, 62, 94, 102, 113, 171, 175/277; 299/62, 33; 405/138, 129.6, 141, 405/184.2, 184.4, 184.5
See application file for complete search history.

(56) References Cited

U.S. PATENT DOCUMENTS

| 2,101,285 | A |  | 12/1937 | Stevens |  |
|---|---|---|---|---|---|
| 4,601,615 | A |  | 7/1986 | Cavalli |  |
| 4,632,602 | A |  | 12/1986 | Hovnanian |  |
| 4,670,305 | A |  | 6/1987 | Morgenthaler et al. |  |
| 5,013,185 | A |  | 5/1991 | Taki |  |
| 5,148,875 | A | * | 9/1992 | Karlsson et al. | ............... 175/62 |
| 5,180,251 | A |  | 1/1993 | Paurat et al. |  |
| 5,199,816 | A |  | 4/1993 | Paurat et al. |  |
| 5,240,348 | A |  | 8/1993 | Breaux |  |
| 5,259,705 | A |  | 11/1993 | Breaux et al. |  |
| 5,280,243 | A |  | 1/1994 | Miller |  |
| 5,316,092 | A | * | 5/1994 | Ilomaki | ...................... 175/62 |
| 5,337,823 | A | * | 8/1994 | Nobileau | ..................... 166/277 |
| 5,388,931 | A |  | 2/1995 | Carlson |  |
| 5,531,895 | A |  | 7/1996 | Alford et al. |  |
| 5,711,385 | A | * | 1/1998 | Brotherton | .................. 175/171 |
| 5,716,164 | A |  | 2/1998 | Biro et al. |  |
| 5,758,993 | A |  | 6/1998 | Schmednecht et al. |  |
| 5,765,965 | A |  | 6/1998 | Carter, Jr. et al. |  |
| 5,800,096 | A |  | 9/1998 | Barrow |  |

(Continued)

OTHER PUBLICATIONS

"Tunneling with Segments Made of Polymer Concrete," Amitech America, Lakewood, OH, date unknown, 4 pages.

*Primary Examiner*—David Bagnell
*Assistant Examiner*—Matthew J. Smith
(74) *Attorney, Agent, or Firm*—TraskBritt, PC

(57) ABSTRACT

A tunneling system including a tunneling apparatus including a cutting structure for forming a borehole and at least one linkage section for transmitting a force generally toward the cutting structure is disclosed. A method of disposing a casing string within a subterranean formation by applying a force generally to the trailing end of the tunneling apparatus, generally toward the leading end thereof, but without transmitting the entire force through the entire casing string is also disclosed. At least one linkage section extending within but not in contact with at least one casing section of the casing string may transmit the force. Also, a force limiting member may limit a force applied to the casing string.

51 Claims, 12 Drawing Sheets

U.S. PATENT DOCUMENTS

| | | |
|---|---|---|
| 5,816,344 A | 10/1998 | Turner |
| 5,816,748 A | 10/1998 | Kleiser et al. |
| 5,879,110 A | 3/1999 | Carter, Jr. |
| 5,905,184 A | 5/1999 | Carter, Jr. |
| 5,915,790 A | 6/1999 | Sakai et al. |
| 5,961,437 A | 10/1999 | Smith et al. |
| 5,971,440 A | 10/1999 | Boatman |
| 6,575,663 B1 | 6/2003 | Kostelnik et al. |
| 6,682,264 B1 * | 1/2004 | McGillis ............ 175/62 |
| 6,758,634 B1 * | 7/2004 | Nickelson et al. ...... 405/129.6 |
| 2002/0107428 A1 | 8/2002 | Nickelson et al. |
| 2003/0152427 A1 | 8/2003 | Nickelson et al. |
| 2003/0175083 A1 | 9/2003 | Kostelnik et al. |
| 2003/0190194 A1 | 10/2003 | Kostelnik et al. |
| 2003/0198517 A1 | 10/2003 | Kostelnik et al. |

* cited by examiner

MICROTUNNELING SYSTEMS AND METHODS OF USE

GOVERNMENT RIGHTS

The United States Government has rights in the following invention pursuant to Contract No. DE-AC07-99ID13727 between the U.S. Department of Energy and Bechtel BWXT Idaho, LLC.

BACKGROUND OF THE INVENTION

1. Field of the Invention

The present invention relates generally to methods, apparatus and systems for disposing casing sections within subterranean boreholes. Also, the present invention relates to forming barriers for waste management by such improved methods, apparatus and systems, and barriers so formed.

2. State of the Art

Containment, management, and disposal of various types of waste, such as chemical, nuclear, and other potentially harmful types of waste are recognized, longstanding problems. It is also well recognized that buried waste may often include heavy metals such as mercury or cadmium, carcinogenic materials such as trichloroethylene, radioactive materials, or other hazardous substances. Further, hazardous materials within buried waste may be leached (i.e., carried from the waste within a liquid) therefrom, into surrounding soil and into the groundwater. Because water is used for human consumption and for agriculture, contamination of groundwater by leaching is a major concern.

However, the contamination caused by buried waste may not be limited solely to groundwater. For instance, contaminated groundwater may be carried into other waterways such as streams, rivers, and lakes, thus polluting those waterways and leading to poisoning of plant and animal life. In addition, polluted waterways pose a threat to humans as well, particularly in the case of waterways and bodies of water used for recreational purposes or as sources of drinking or irrigation water.

Also, while many of the problems associated with buried waste arise from the effect of leachate on water systems, buried waste may also emit gas phase contaminants that may cause deleterious effects if not contained and managed. For instance, such gas phase contaminants may pollute the soil and the groundwater, and may build up to unsafe pressures which could ultimately result in an explosion, or pollution of the atmosphere by venting of the gas.

Accordingly, a variety of methods and devices have been devised to attempt to resolve the problems related to buried waste. These remedies may be broadly grouped into the categories of remediation and containment. Generally, remediation focuses on processes designed to change the chemical composition of a contaminated material or contaminant to a more benign chemical composition, while containment remedies seek to isolate contaminants and contaminated material within an area or remove them from an area.

Remediation approaches such as biological treatments, thermal processes, and chemical processes may be problematic for a variety of reasons. In particular, many remediation techniques may be expensive and potentially hazardous. Further, it may be difficult to verify the effectiveness of many remediation treatments. Also, determining the proper or optimum remediation technique for a given contamination scenario may be, in itself, a complex and time-consuming process.

Containment, barrier, or in situ, approaches may be problematic as well. One known containment approach is simply to dig up and remove the contaminated soil for treatment and/or disposal. This approach is expensive and time-consuming and often accomplishes little more than moving the problem to another location. Of course, finding an acceptable ultimate disposal location is another significant impediment to movement of a contaminated region. Other containment approaches involve installing vertical barriers, horizontal barriers, or both types of barriers around the buried waste. In theory, this approach is attractive because it does not require digging up or otherwise disturbing the buried waste.

However, conventional containment or barrier systems suffer from a variety of inadequacies including a lack of durability, corrosion resistance, and structural integrity. These inadequacies are a function of numerous factors associated with the environment in which the containment or barrier systems are located including, but not limited to: exposure to harsh chemicals such as concentrated saline solutions, saturated calcite and gypsum solutions; exposure to extreme thermal gradients; and exposure to stresses induced by shifting in the earth within and adjacent the contaminated area. In addition, conventional barrier systems may suffer from inadequate ability to monitor or verify the integrity thereof as well as inadequate reparability thereof if a failure should occur.

Accordingly, recently, containment systems that are designed to contain, collect, or process effluent which would otherwise escape from a zone containing waste materials, have been developed. One such containment system is disclosed in U.S. Pat. No. 6,575,663 to Kostelnik, et al., assigned to the assignee of the present invention, the disclosure of which is incorporated in its entirety by reference herein. More particularly, U.S. Pat. No. 6,575,663 discloses a barrier comprising a series of adjacent casing strings that are interlocked with one another and may be filled with a barrier filling material to form a substantially continuous wall. Casing strings are disclosed as being disposed within the subterranean formation by way of so-called "microtunneling" techniques.

Since microtunneling was developed, it has been extensively used for the installation of new pipeline infrastructure, particularly for the water industry in a variety of subterranean formation types, including ironstone, sandstone, shale, clay, and sand. Conventional microtunneling involves the construction of a bored hole by way of a rotating cutting structure disposed on the forward end of a microtunneling machine and forcing the microtunneling machine along a tunneling path with a casing jacking apparatus that provides force to thrust the assembly of a casing string and a microtunneling machine into the subterranean formation. Casing sections may either be jacked in directly behind the microtunneling apparatus or, alternatively, may be jacked into a borehole subsequent to formation thereof. In addition, compressed air or slurry systems for removing cuttings as the microtunneling apparatus advances within the formation may be employed.

FIG. 1A illustrates a schematic side view of a conventional microtunneling apparatus 10 during use, conventional microtunneling apparatus 10 including a pipe jacking apparatus 11, a casing string 17 formed of casing sections 15 which are affixed to one another in an end-to-end relationship, and a microtunneling machine 18.

FIG. 1B shows an enlarged, side cross-sectional view of conventional microtunneling machine 18. Microtunneling machine 18 may include a rotatable portion 114 and a stationary portion 115. Torque may be applied to rotatable portion 114 of microtunneling machine 18 by way of a hydraulic motor (not shown) which is responsive to a sufficient flow of pressurized fluid into port 124 or may be configured to rotate by way of an electric motor or a combustion engine, without limitation. In such a case, port 124 may be configured to accept electricity, fuel, or both, to the microtunneling machine 18.

Rotatable portion 114 may be affixed to shaft 126, wherein shaft 126 may be configured with impeller-type features 127 which may be configured to rotate with rotatable portion 114, so as to push cuttings from the subterranean formation out through port 122 as the microtunneling machine 18 advances into a formation during use. In addition, microtunneling machine 18 may include cutting structure 116 disposed upon the leading end 120 of rotatable portion 114, the cutting structure 116 configured for rotating about longitudinal axis 111. Microtunneling machine 18 may also include a trailing end 118 for connection with casing sections 15 or other structural members.

Pipe jacking apparatus 11 may be disposed within a launch pit 9 and may include frame 25 to which a hydraulic power unit 23 is affixed and one or more hydraulic pistons 20 are movably affixed by rods 22 to a forcing plate 21. More particularly, as shown in FIGS. 1C and 1D, forcing plate 21 of pipe jacking apparatus 11 may be caused to move along frame 25 and apply force to the end 29 of the casing section 15 extending from borehole 14 away from entry point 16 (FIG. 1A). FIG. 1C shows forcing plate 21 in a contracted state, wherein its position relative to frame 25 may be illustrated by distance x1. FIG. 1D shows forcing plate 21 in an expanded state, wherein its position relative to frame 25 may be illustrated by distance x2. Once forcing plate 21 is positioned at distance x2, it may be retracted to distance x1, and another casing section (not shown) may be disposed between the end 29 of the existing casing section 15 and the forcing plate 21. Further, the two casing sections 15 may be affixed to one another by threaded connection, welding, or mechanical fasteners. Of course, repeatedly cycling the forcing plate 21 between positions corresponding to x1 and x2, while installing additional casing sections 15 may incrementally form a casing string providing a casing-lined borehole 14.

Further, additional equipment such as hydraulic power units, fluid delivery systems, and fluid recovery and processing systems may be utilized to supply microtunneling machine 18 with electricity, combustible fuel, pressurized fluid, or compressed gas for causing rotation of the leading end 120 thereof and to remove cuttings that are generated as microtunneling machine 18 progresses through formation 13, as known in the art. Pressurized fluid or compressed gas may be supplied by conducting lines that follow within casing string 17. Also, the drilling path of microtunneling machine 18 may be directionally controlled or guided as known in the art.

Thus, conventional microtunneling apparatus 10 may be utilized to form a casing-lined borehole 14 underneath formation 13 by advancing hollow casing sections 15 through formation 13 from entry point 16 to exit point 19. Conventional microtunneling systems, while enjoying relative success, rely on casing sections 15 that are able to withstand the stresses generated therein by the forces applied thereto by pipe jacking apparatus 11. Generally, the stresses experienced by the casing sections 15 may be compressive in nature, since the pipe jacking apparatus 11 may force the casing sections 15 into the formation 13 against both friction and the forces of microtunneling. However, higher stresses may develop between casing sections 15 in response to connections between casing sections 15 and bending of the casing string 17 to accomplish directional microtunneling.

Therefore, conventional microtunneling apparatus and processes may be currently limited in materials that are suitable for use in forming casing sections 15. Specifically, materials having a relatively high compressive strength, such as steel, may be used in combination with conventional microtunneling apparatus successfully. However, due to the magnitude of the forces applied to casing sections 15 during conventional installation and pipe jacking, many materials that may be superior, at least in some respects, to conventional metal casing sections, but may exhibit lower compressive strengths than are necessary to withstand the forces generated by pipe jacking, may not be employed by conventional microtunneling systems. For instance, a wide variety of polymer materials may exhibit corrosion resistance superior to the corrosion resistance exhibited by steels or stainless steels but may not possess compressive strengths that are required for successful placement within a subterranean formation according to conventional processes and apparatus.

In an alternative, conventional approach for disposing a casing string within a subterranean formation, U.S. Pat. No. 6,682,264 to McGillis discloses a method for installation of underground pipe in which a microtunneling apparatus affixed to a pilot tube drills a pilot hole into a surface of a formation and exits the surface of the formation at a different position. Then, a reamer may be installed on the protruding end of the pilot tube and a pipe connected to the end of the microtunneling apparatus may be pulled into the back-reamed hole that is formed as the microtunneling apparatus is retracted through the pilot hole and reams the same, forming a larger size hole for the pipe to fit within. Such a method may be time consuming and more expensive, since initially forming a pilot hole and then reaming through the pilot hole essentially drills the desired path two times.

In view of the foregoing problems and shortcomings with existing microtunneling apparatus, methods, and systems, it may be desirable to provide improved methods, apparatus, and systems for disposing casing sections within boreholes via tunneling methods and apparatus. Also, it may be desirable to form barriers for waste management by such improved methods, apparatus, and systems.

BRIEF SUMMARY OF THE INVENTION

The present invention relates to a tunneling system for disposing casing sections into a subterranean formation. More particularly, the present invention relates to a tunneling apparatus including a leading end (taken in an intended direction of tunneling) comprising a rotatable portion including a cutting structure and a casing string comprising at least one casing section, wherein the casing string is in structural communication with the tunneling apparatus. The tunneling system of the present invention may include at least one linkage section which may be sized, configured and oriented for transmitting a force to the rear of the tunneling apparatus, such as proximate a trailing end thereof, and generally toward the cutting structure of the tunneling apparatus. Furthermore, the at least one linkage section may be disposed within the casing string, extending longitudinally away from the cutting structure of the tunneling apparatus.

The present invention also relates to a method of disposing a casing string within a subterranean formation. Specifically, a tunneling apparatus may be provided and configured with a cutting structure at the leading end thereof and a casing string comprising at least one casing section may be placed in structural communication with the tunneling apparatus. Also, a force may be applied generally to the tunneling apparatus to the rear (as taken in the intended direction of tunneling) of the cutting structure and generally toward the cutting structure, but without transmitting the entire force through the casing string. More specifically, a force may be applied generally to the trailing end of the tunneling apparatus, generally toward the cutting structure thereof, through a linkage extending longitudinally within and affixed to the casing string. Further, tunneling into a subterranean formation with the cutting structure of the tunneling apparatus may be effected. Additionally, the force which may be applied generally to the trailing end of the tunneling apparatus may be transmitted through at least one force transmitting member affixed proximate to the trailing end of the tunneling apparatus. Alternatively, two or more force transmitting member may be configured to engage respective engagement features of casing sections comprising the casing string.

The apparatus and systems mentioned above may be used for forming a containment system for containing a selected region or volume of an earth formation. The containment system may include a plurality of laterally adjacent, adjoined casing strings, wherein the plurality of casing strings are positioned to collectively form a continuous barrier about a selected region or volume.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

Generally, conventional microtunneling machine 18 as well as conventional pipe jacking apparatus 11, as shown in FIGS. 1A–1D may comprise respective portions of the present invention. However, as discussed in more detail hereinbelow, the present invention contemplates that the transmission of force from the pipe jacking apparatus 11 to the microtunneling machine 18 may occur at least partially through structural elements other than through casing sections 117 affixed thereto.

Figure 2A:
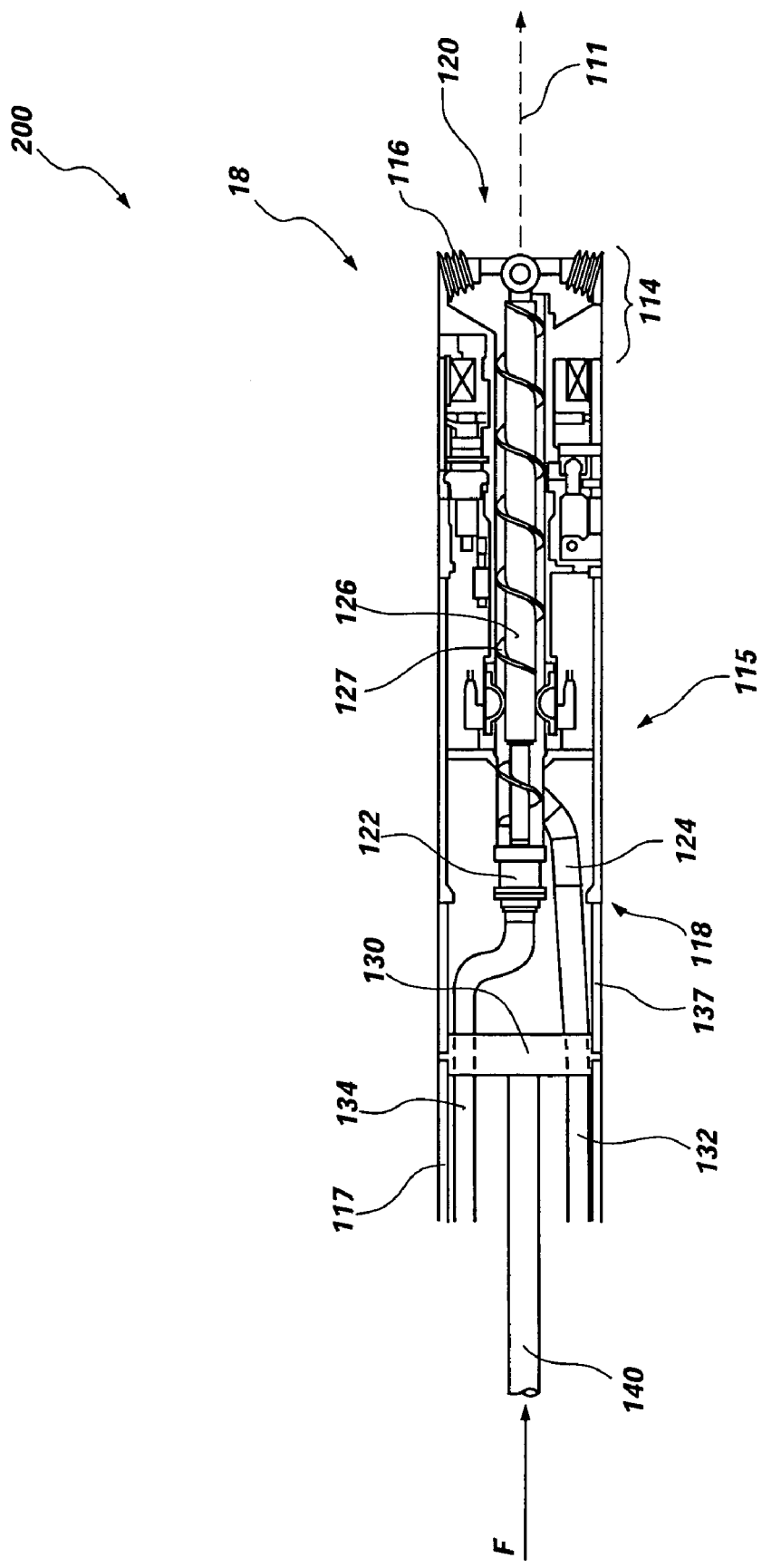
FIG. 2A shows an enlarged, schematic side cross-sectional view of a tunneling assembly of the present invention.

FIG. 2A shows a side cross-sectional view of a tunneling assembly 200 of the present invention including microtunneling machine 18, force transmitting member 130, and a casing section 117 affixed thereto. More generally, as discussed below, a casing string (not shown) may comprise two or more casing sections 117 affixed to one another in an end-to-end relationship. Therefore, casing section 117, as used herein, may refer to a single casing section 117 or to a plurality of longitudinally adjacent casing sections 117.

As explained above, conventional microtunneling machine 18 may include a rotatable portion 114 and a stationary portion 15. As mentioned above, rotatable portion 114 of microtunneling machine 18 may rotate, a torque may be applied thereto, or both responsive to an impetus such as pressurized fluid supplied by conduit 132 and passing into microtunneling machine 18 via port 124. More particularly, rotatable portion 114 of microtunneling machine 18 may be powered by a closed-loop hydraulic circuit with a pressurized supply line and a return line disposed within conduit 132. Accordingly, microtunneling apparatus 18 may include a hydraulic motor (not shown) which is configured to apply a torque to rotatable portion 114 thereof to cause rotation thereof upon sufficient supply of pressurized fluid thereto via conduit 132 and port 124. Of course, the drive for tunneling assembly 200 is not limited to including a hydraulic motor; rather, other devices for causing rotation of rotatable portion 114 of microtunneling machine 18 may be employed, such as an electric motor or a combustion engine, without limitation. Accordingly, conduit 132 and port 124 may be configured to supply electricity, fuel, or both, to the drive for microtunneling machine 18.

Microtunneling machine 18 may include cutting structure 116 disposed upon the leading end 120 of rotatable portion 114, the cutting structure 116 configured for engaging and tunneling into a formation by removal of cuttings of formation material. Further, rotatable portion 114 may also be affixed to shaft 126, wherein shaft 126 may be configured with impeller-type features 127 which are configured to facilitate the removal of formation cuttings that have been tunneled or drilled by the cutting structure 116 of microtunneling machine 18 through port 122 and within return conduit 134.

Preferably, especially when tunneling into formations which may contain waste materials, to prevent generation of and possible migration of effluent therefrom, microtunneling machine 18 may be used without any fluid supplied to the cutting structure 116. Therefore, vacuum assistance, pressurized gas, or fluid assistance systems may be employed to remove formation cuttings that exit port 122 or enter return conduit 134. Alternatively, a conveyer system disposed within the interior bore of casing section 117 may be used to remove cuttings therefrom. It should also be understood that formation cuttings may exit port 122 without return conduit 134 being present. In such a configuration, formation cuttings may be disposed within casing section 117, for removal subsequent to completion of the tunneling operation.

Microtunneling machine 18 may comprise a microtunnel boring machine, or micro TBM, as known in the art. For instance, microtunneling machine 18 may be of a type commercially available from Komatsu Ltd. of Komatsu City, Ishikawa or from Akkerman Inc. of Brownsdale, Minn. However, the present invention is not limited to such devices; rather, other tunneling, boring, or drilling devices including, but not limited to, drill bits coupled to corresponding downhole motors (preferred for hard soil and soft rock), multi-face tunnel boring machines, multi-face shielded tunnel boring machines, shielded tunnel boring machines coupled to horizontal cutting screw augers, pipe propulsion devices, curved pipe propulsion systems, trench cutting systems, and the like are contemplated as being within the scope of this invention and may comprise microtunneling machine 18.

Generally, the present invention contemplates that a casing string comprising at least one casing section may be in structural communication with the trailing end of the tunneling apparatus to the rear (taken in the intended direction of tunneling) of the cutting structure and a force may be applied to the trailing end of the tunneling apparatus, generally toward the cutting structure thereof, but without transmitting the entire force through the entire casing string. Of course, tunneling into a subterranean formation with the cutting structure of the tunneling apparatus may occur by way of the force applied thereto in combination with rotation of the cutting structure.

More specifically, as shown in FIG. 2A, spacer section 137 may be affixed to the trailing end 118 of microtunneling machine 18 via threaded connection, welding, mechanical fasteners, or as otherwise known in the art. Likewise, force transmitting member 130 may be affixed to spacer section 137 and casing section 117 may be affixed to spacer section 137 via threaded connection, welding, mechanical fasteners, or as otherwise known in the art. Further, linkage section 140 may be affixed to force transmitting member 130, extending longitudinally away from force transmitting member 130 within the bore of the casing section 117.

The tunneling assembly 200 shown in FIG. 2A may include one or more casing sections 117 and one or more linkage sections 140, without limitation. Explaining further, more than one casing section 117 may be affixed to one another in a longitudinal end-to-end relationship, extending from force transmitting member 130. Likewise, more than one linkage section 140 may be affixed to one another in a longitudinal end-to-end relationship extending from force transmitting member 130 and within the bore of the one or more casing sections 117. Thus, the tunneling assembly 200 of the present invention may comprise at least one casing section 117 and at least one linkage section 140.

Figure 2B:
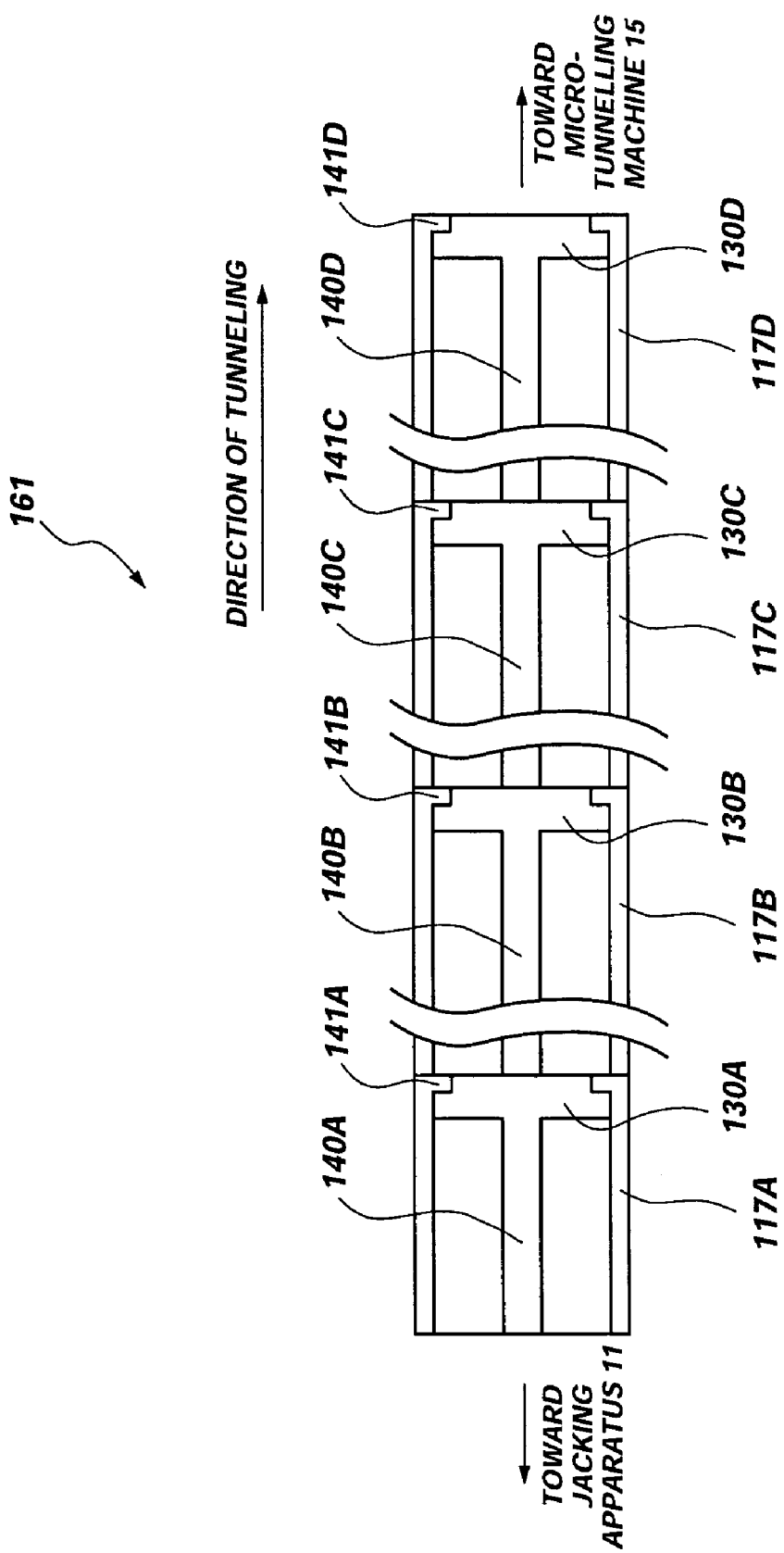
FIG. 2B shows a schematic side cross-sectional view of a casing assembly according to the present invention.

During operation, by applying a force, labeled "F," to the at least one linkage section 140, a force directed generally toward an intended tunneling direction may be applied to the microtunneling machine 18. Preferably, force "F" may be substantially parallel with the longitudinal axis (or tunneling axis) of the microtunneling machine 18. However, alternatively, force applied generally toward cutting structure 116 but in a direction noncoincident with the tunneling axis may facilitate the movement of microtunneling machine 18 into formation 180 (FIG. 2B). For instance, directional tunneling may be achieved by applying force which may not be oriented with the longitudinal axis 111 of the microtunneling machine 18 but, rather, may be applied at an angle thereto. Therefore, generally, a force may be provided via the at least one linkage section 140 to the trailing end 118 of the microtunneling machine 18 in a direction generally toward the cutting structure 116 thereof.

Accordingly, although the linkage section 140 affixed to force transmitting member 130 is shown, in FIG. 2A, as extending longitudinally perpendicular thereto and substantially centered within casing section 117, the present invention contemplates that linkage section 140 may be pivotably affixed to force transmitting member 130 so as to allow the linkage section 140 to be disposed at an orientation other than at a substantially parallel orientation in relation to force transmitting member 130. For instance, linkage section 140 may be pinned or may be affixed to force transmitting member 130 via a ball-joint type connection. However, since linkage sections 140 may extend within the inner diameter of casing sections 117, the angular departure of the orientation of linkage sections 140 with respect to the axis of casing sections 117 may be limited so as to avoid contact therewith. Such a configuration may provide improved directional flexibility, which may improve the directional tunneling characteristics or capability of tunneling assembly 200. Alternatively, linkage sections 140 may comprise a tubular shape, and may extend proximate to and along the inner bore wall of casing sections 117. With such an arrangement, the wall of tubular linkage section 140 may be relatively thin while providing sufficient rigidity to transmit longitudinal force without buckling of casing sections 117.

In addition, many alternative configurations are contemplated for affixing a force transmitting member to a casing section 117. For instance, it may be noted that a linkage section 140 of the present invention may be configured to be controllably or selectively affixed to a casing section 117. For instance, force transmitting member 130 may be configured to selectively expand and be affixed to, or contract and be released from, the bore wall of the casing section 117. Such a force transmitting member 130 may be expanded hydraulically, pneumatically, or by way of an electric motor. Such a configuration may be desirable to allow the force transmitting member 130 to be positioned selectively within the bore of a casing section 117 relative thereto. Of course, a casing section 117 to which a selectively expandable force transmitting member 130 is configured to be affixed may be specially configured accordingly to facilitate affixation of the selectively expandable force transmitting member 130 thereto.

In a further alternative, more than one linkage section may include a force transmitting member. For instance, as shown in FIG. 2B, casing assembly 161 may comprise a plurality of casing sections 117A, 117B, 117C, and 117D affixed to one another in a longitudinal end-to-end relationship. Further, a plurality of linkage sections 140A, 140B, 140C, and 140D may be affixed to one another in an end-to-end relationship and may extend longitudinally within casing string 157. However, each of linkage sections 140A, 140B, 140C, and 140D may include a respective force transmitting member 130A, 130B, 130C, and 130D each of which is configured to transmit force to each of casing sections 117A, 117B, 117C, and 117D, respectively. In further detail, each of casing sections 117A, 117B, 117C, and 117D may include an engagement feature 141A, 141B, 141C, and 141D, respectively, which is configured for matingly engaging at least a portion of a respective force transmitting members 130A, 130B, 130C, and 130D.

It may be appreciated that each of the plurality of force transmitting members 130A, 130B, 130C, and 130D may substantially simultaneously contact its associated engagement feature 141A, 141B, 141C, and 141D by way of longitudinal movement of the plurality of linkage sections 140A, 140B, 140C, and 140D in the direction of tunneling (i.e., toward the leading end of micro-tunneling machine 18). The present invention further contemplates that each of the plurality of force transmitting members 130A, 130B, 130C, and 130D may be selectively positioned along the length of casing string 157 for distributing the force of tunneling as desired therein. More generally, the present invention contemplates that at least two force transmitting members may be selectively positioned along the length of casing string as desired for transmitting force to the casing string from a plurality of linkage sections.

As may be appreciated, since linkage section 140 may be configured to transmit force therethrough, linkage section 140 (and any additional linkage section(s) 140) may comprise a material exhibiting a compressive strength sufficient to operate microtunneling machine 18 by moving it forward as well as to pull the at least one casing section 117 into a borehole formed therewith.

It may also be noted that a conventional tunneling assembly may include at least one casing section 117 affixed to the trailing end 118 of microtunneling machine 18. However, during conventional operation, compressive jacking force would be applied to microtunneling machine 18 exclusively through a casing string comprising the affixed at least one casing section 117. In contrast to a conventional tunneling assembly, the present invention contemplates that a force, labeled "F" in FIG. 2A may be at least partially transferred through at least one linkage section 140, force transmitting member 130, and to microtunneling machine 18. Some benefits of such a configuration during use are discussed hereinbelow.

Figure 2C:
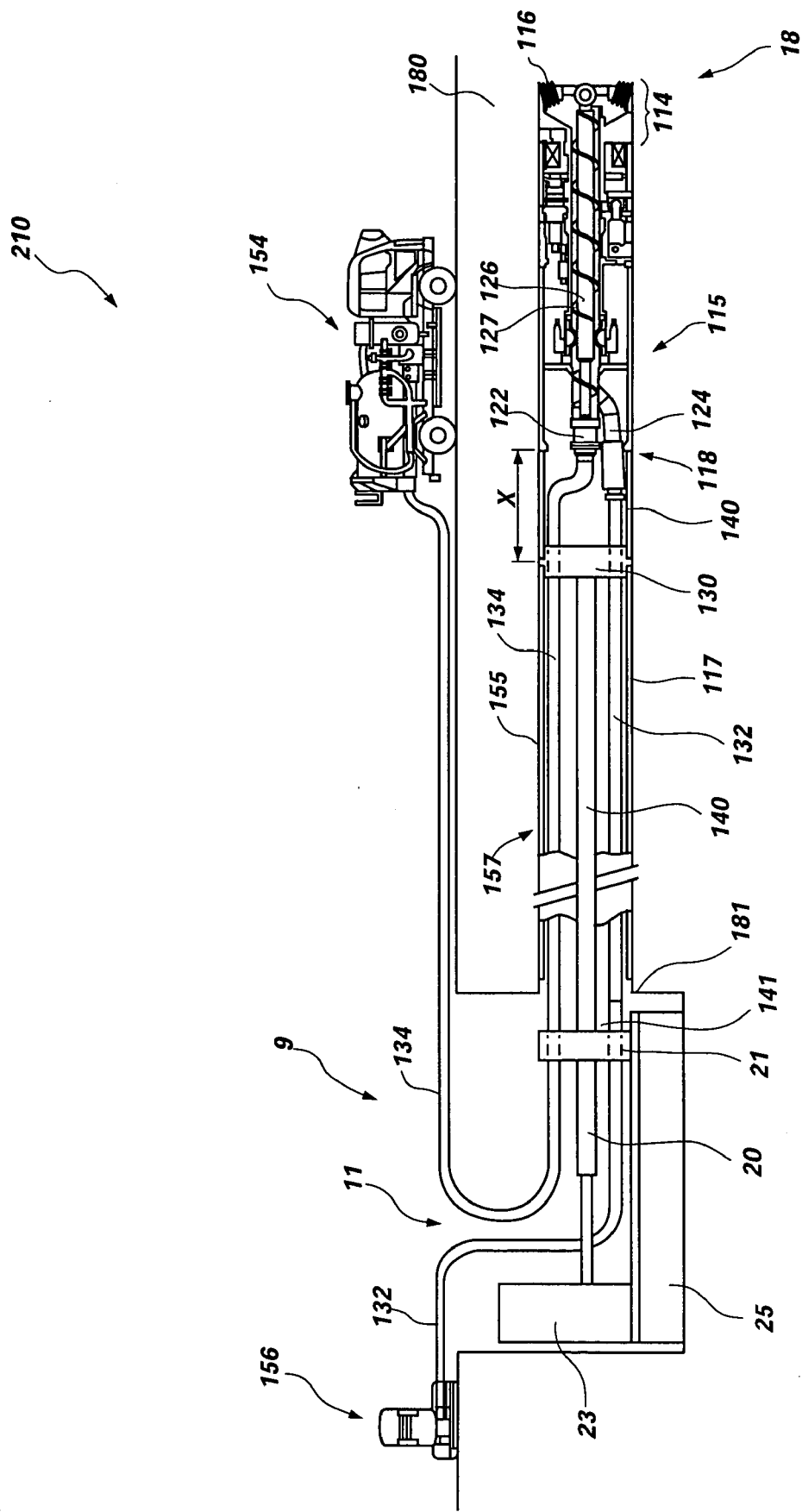
FIG. 2C shows schematic view of a tunneling system of the present invention.

FIG. 2C shows a schematic view of a tunneling system 210 of the present invention comprising microtunneling apparatus 18 affixed to pipe jacking apparatus 11, cuttings removal system 154, and power unit 156. In FIG. 2C, microtunneling system 210 is shown during operation, i.e., forming borehole 155 within formation 180. Power unit 156 may comprise a hydraulic pump configured to supply (and return) pressurized fluid to microtunneling apparatus 18 for generating torque upon the rotatable portion 114 thereof during operation.

Cuttings generated by the microtunneling machine 18 during operation may be carried or may flow within conduit 134 generally opposite to the direction of tunneling within casing section 117 to a tank or other container within cuttings removal system 154. For instance, compressed gas, such as air, may be supplied to microtunneling machine 18 and may be directed so as to draw formation cuttings away from cutting structure 116 and into conduit 134. Alternatively, a fluid or slurry may be supplied to carry out formation cuttings from the leading end of the microtunneling machine 18. In a further alternative, the formation cuttings may be deposited within casing sections 117 and removed subsequent to the completion of tunneling. As may be appreciated, there may be other alternative configurations for cuttings disposition depending on the tunneling apparatus and supporting equipment employed.

Figure 1A:
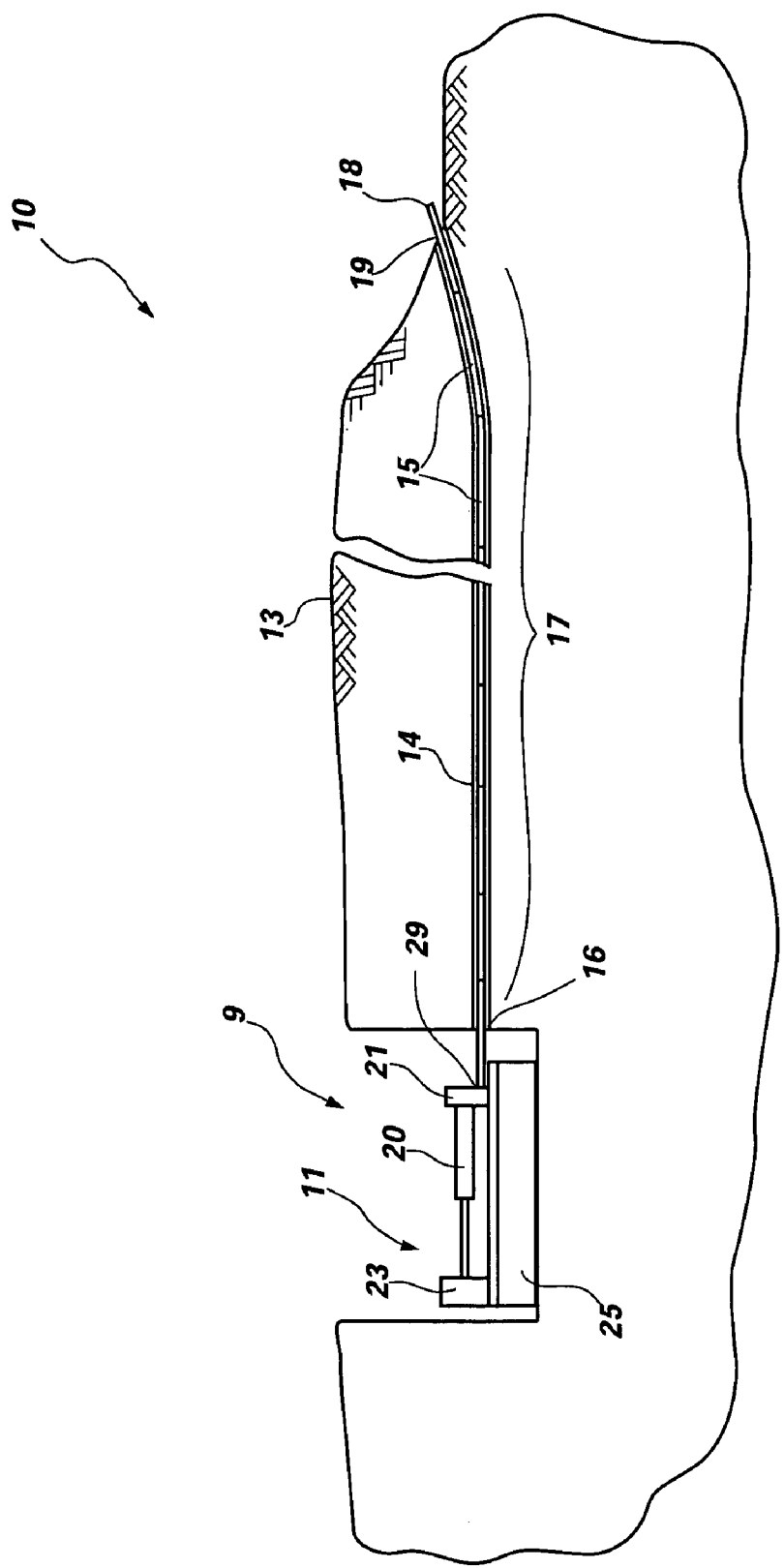
FIG. 1A shows a schematic side view of a conventional microtunneling assembly.
Figure 1B:
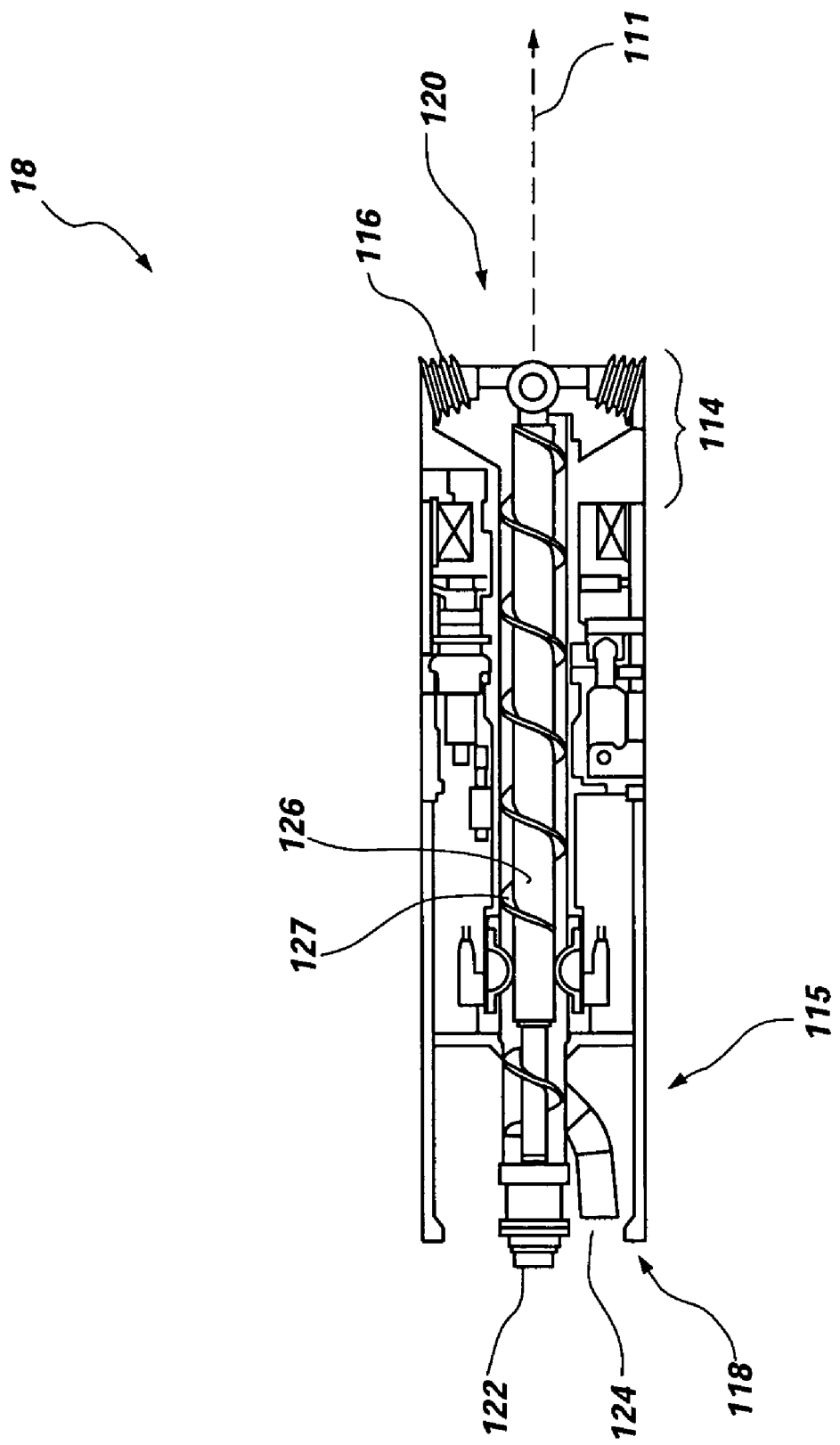
FIG. 1B shows an enlarged, schematic side cross-sectional view of a conventional microtunneling machine.
Figure 1C:
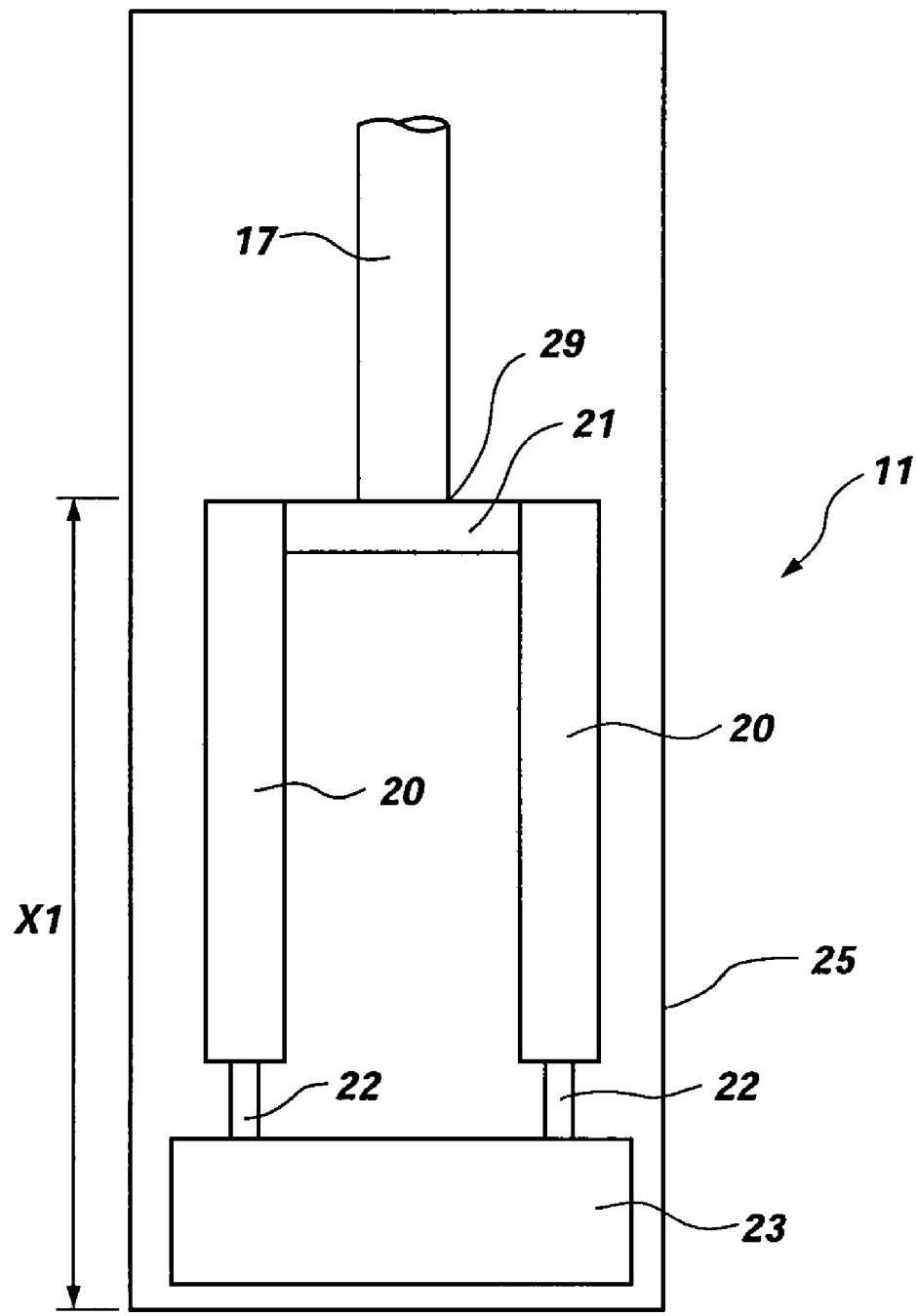
FIG. 1C shows a schematic top elevation of a conventional pipe jacking apparatus in a contracted state in preparation for jacking a casing section.
Figure 1D:
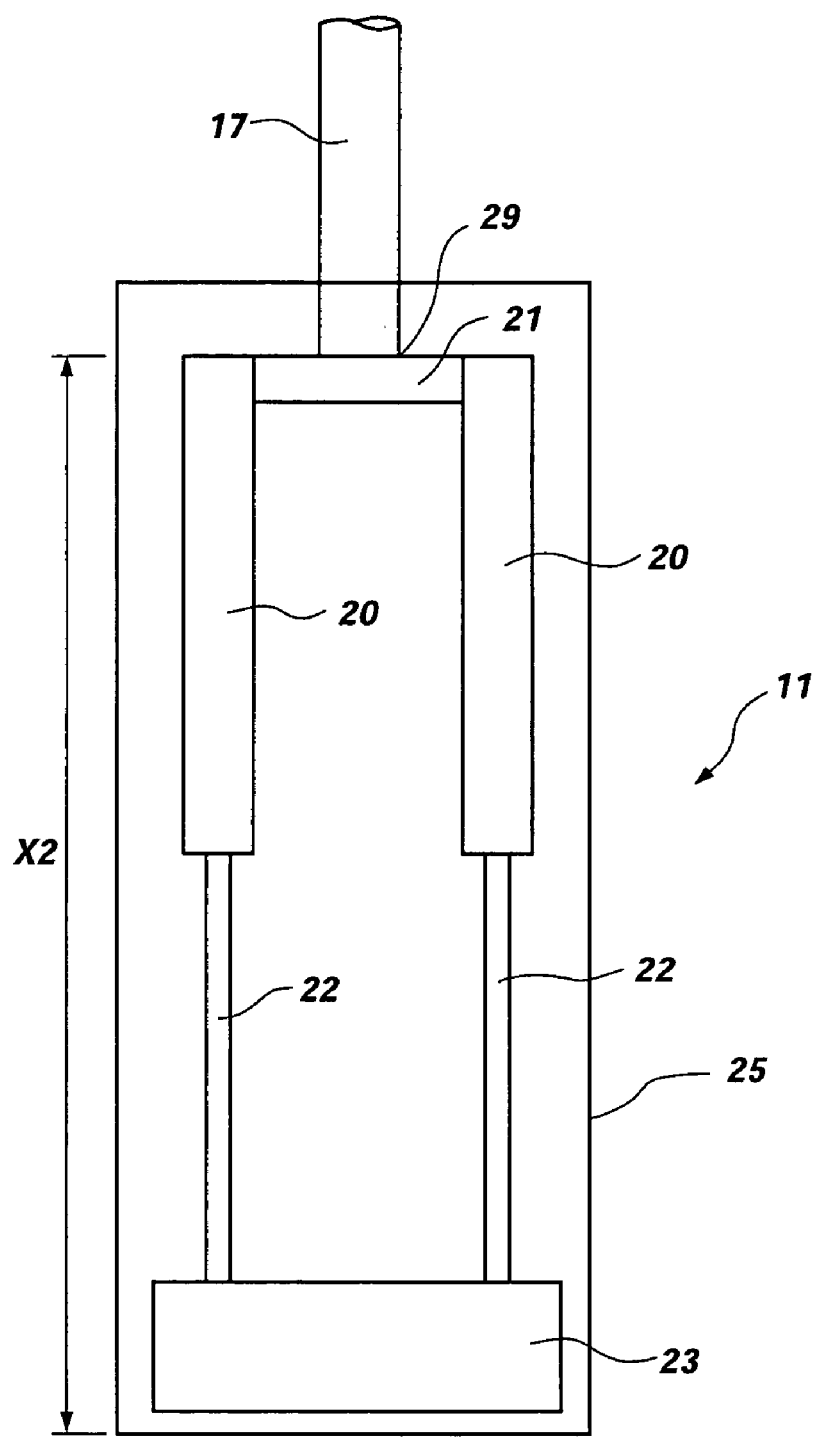
FIG. 1D shows a schematic top elevation of a conventional pipe jacking apparatus in an extended state after a casing section has been jacked forward.

Conventional pipe jacking apparatus 11 may be configured to move between a retracted position x1 and an extended position x2, as shown in FIGS. 1C and 1D. Thus, hydraulic pistons 20 may be configured to apply a force to the adjacent end 141 of linkage section 140. Thus, such force may be transmitted via forcing plate 21 through linkage section 140, through force transmitting member 130, and to microtunneling machine 18. Therefore, as microtunneling machine 18 tunnels into a subsurface formation 180, the casing section 117 affixed thereto may follow, or be pulled, into the borehole 155 formed therewith.

Accordingly, as tunneling proceeds in response to operation of microtunneling machine 18, force plate 21 may be displaced to a position proximate entry point 181, as shown in FIG. 2C. Then, force plate 21 may be decoupled from end 141 of linkage section 140, retracted toward hydraulic power unit 23, and an additional linkage section 140 and an additional casing section 117 may be affixed to the respective ends of the casing section 117 and linkage section 140 which protrude from the entry point 181 of subsurface formation 180. Adjacent casing sections 117 comprising casing string 157 may be affixed to one another by way of threads, welding, adhesive, or as otherwise known in the art. More particularly, welding, as used herein, refers to thermal or chemical welding processes, as known in the art. Therefore, for example, if the casing sections 117 comprise a polymer, a solvent weld may be formed between adjoining casing sections 117. Similarly, adjacent linkage sections 140 may be affixed to one another by way of threaded connection, welding, mechanical fasteners, or as otherwise known in the art. Accordingly, tunneling may continue as the pipe jacking apparatus 11 is operated to force the casing string 157 and microtunneling machine 18 into formation 180.

The configuration of the tunneling system 210 as described above may be desirable, because the compressive forces experienced by one or more casing sections 117 affixed to force transmitting member 130 may be relatively low in magnitude when compared to the forces that are required to force the microtunneling machine 18 into the formation 180. Put another way, the longitudinal force necessary for operation of microtunneling machine 18 may be transmitted at least partially through linkage section 140, bypassing casing sections 117 to a significant extent or even completely. Therefore, as may be appreciated, force experienced by casing sections 117 affixed to force transmitting member 130 may be tensile in nature, since casing sections 117 are being pulled, rather than pushed, into the borehole as they follow microtunneling machine 118.

Therefore, materials that exhibit sufficient tensile strengths may comprise casing sections 117. Explaining further, at least one casing section 117 that comprises a material that does not exhibit sufficient compressive strength to withstand, without damage, the entire force of pipe jacking may be used in the tunneling system 210 of the present invention, since the magnitude of compressive stress, if any, applied to casing section(s) 117 may be relatively low as compared to the magnitude of stresses applied by conventional jacking techniques. Put another way, casing sections 117 may be employed by the present invention that exhibit modest resistance to tensile stress. However, materials comprising one or more of casing sections 117 may exhibit exemplary resistance to chemical degradation. Such materials may include, without limitation, polyvinyl chloride (PVC), polypropylene, high density polyethylene (HDPE), or polyvinylidene fluoride (PVDF).

In addition, materials comprising one or more of casing sections 117 may comprise cement or ceramics, such as alumina. Ceramics may exhibit exemplary resistance to corrosion or other chemical degradation. In a further alternative, vitrified clay materials may comprise casing sections 117 according to the present invention.

Further, metals may comprise at least one of casing sections 117 according to the present invention. For instance, aluminum, nickel, or bronze may comprise casing sections 117 according to the present invention. However, the apparatus and methods of the present invention are not limited to employing casing sections comprising nonferrous metals. Therefore, casing sections comprising a ferrous metal, such as steel or stainless steel, may be employed by the present invention, without limitation. For example, thin-walled steel or stainless steel casing sections which are unsuitable for conventional, compressive jacking may be employed. Similarly, casing sections formed of thin-walled steel coated with an inert, corrosion-resistant polymeric material may be used.

As yet a further alternative, a composite material may comprise one or more of casing sections 117. Generally, a matrix material may be reinforced by at least one fiber or other structurally strengthening constituent dispersed therein or as otherwise known in the art for increasing the tensile strength thereof. For instance, a fiber-reinforced material (e.g., fiberglass or the like) may comprise at least one casing section, without limitation. Further, materials which commonly exhibit relatively low tensile strengths may be used in combination with reinforcement and may be configured for withstanding tensile stress. For instance, a matrix such as HDPE, clay, or cement, including a strengthening constituent such as unidirectional graphite fibers oriented along the length of the casing section may comprise at least one casing section 117. In addition, at least one of casing sections 117 may comprise a laminated structure having a plurality of radially arranged layers which are mutually bonded to one another, as known in the art. Optionally, at least one of casing sections 117 may include a coating on the exterior surface, the interior bore, or both.

Thus, the present invention contemplates that the jacking force required for moving casing string 157 into a tunnel or borehole 155 may be at least partially transferred through linkage section 140 in a direction generally toward the cutting structure 116 of microtunneling machine 18. There are many embodiments and variations of the present invention which may be used to effect such operation. For instance, force transmitting member 130 may be affixed directly to the trailing end 118 of microtunneling machine 18, without spacer section 137. Alternatively, linkage section 140 may be designed to fit into the trailing end 118 of microtunneling machine 18. As may be appreciated, many alternative configurations may be employed as a matter of design choice in light of commercially available tunneling or excavation equipment already in possession of a particular operator.

Alternatively, a selectively affixable and releasable force transmitting member 130 may be disposed within a casing section 117 for transmitting force for moving casing string 157 and microtunneling machine 18 into formation 180. For instance, force transmitting member 130 may be expandable or otherwise configured to engage the inner diameter of the casing string 157. Therefore, the distance, labeled "x" in FIG. 2C, between the trailing end 118 of the microtunneling machine 18 and the force transmitting member 130 may be selected. Furthermore, the distance, labeled "x" between the trailing end 118 of the microtunneling machine 18 and the force transmitting member 130 may be adjusted as desired during tunneling operations. Employing such a configuration may allow for flexibility in design and flexibility during operation of a tunneling system of the present invention. Furthermore, such a configuration may allow for adjusting the magnitude of the compressive force developed between the trailing end 118 of the microtunneling machine 18 and the force transmitting member 130 in relation to the magnitude of the tensile force developed in the casing string 157 extending away from, and to the rear of, the microtunneling machine 18.

Figure 2D:
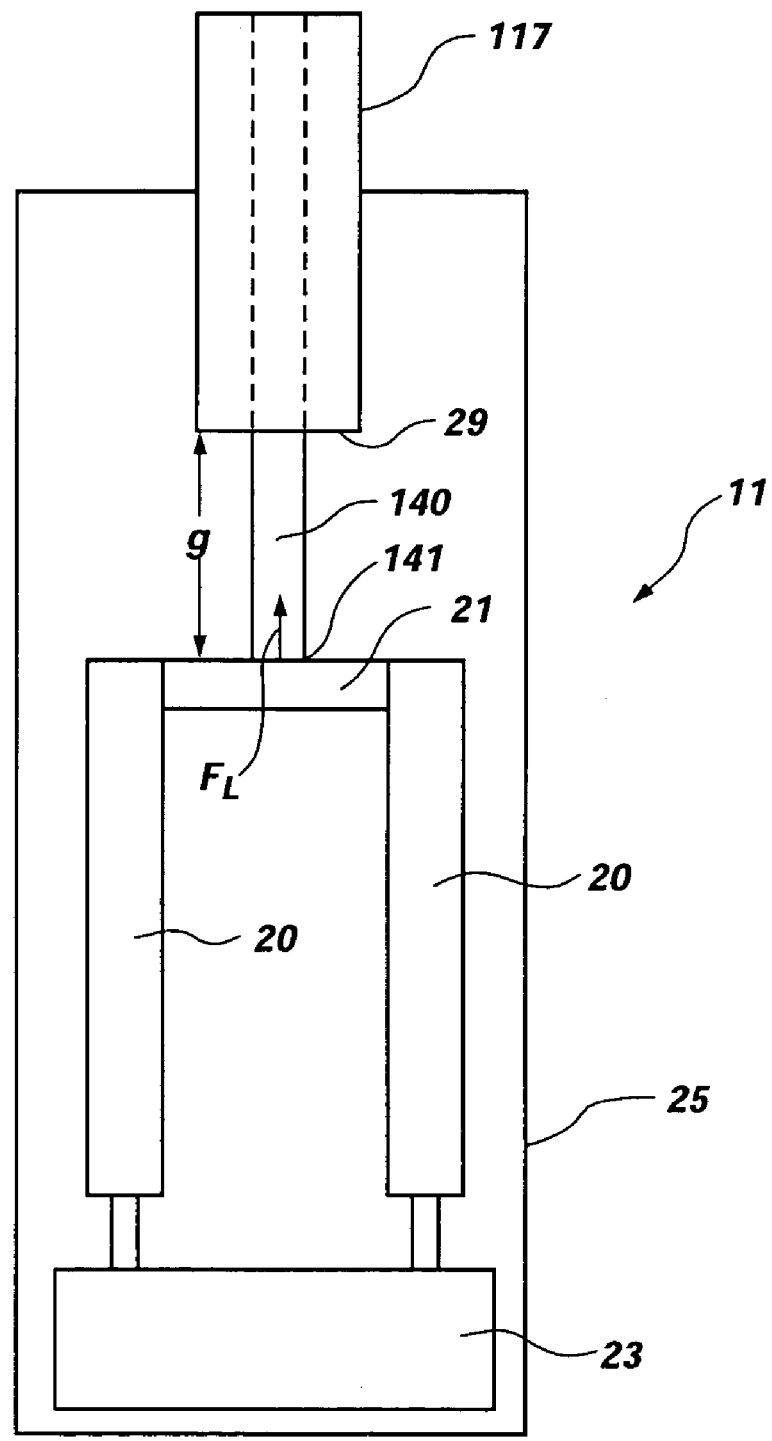
FIG. 2D shows a top elevation view of a pipe jacking assembly of the present invention.

In one exemplary embodiment, a force applied to microtunneling machine 18 for tunneling into subterranean formation 180 may be substantially entirely transferred through linkage section 140 in a direction generally toward the cutting structure 116 of microtunneling machine 18. Particularly, FIG. 2D shows a top elevation view of jacking apparatus 11 in relation to casing section 117 and linkage section 140. A gap, labeled "g" between forcing plate 21 and the unattached end 29 of casing section 117, mechanically decouples casing section 117 from forcing plate 21. Thus, jacking force may comprise force $F_L$, which may be substantially entirely transferred through at least one linkage section 140. In general, assuming $F_L$ exceeds the frictional resistance to forcing the casing string 157 into the borehole, the excess of $F_L$ over the frictional resistance may be transferred or applied to microtunneling machine 18 for tunneling.

Figure 2E:
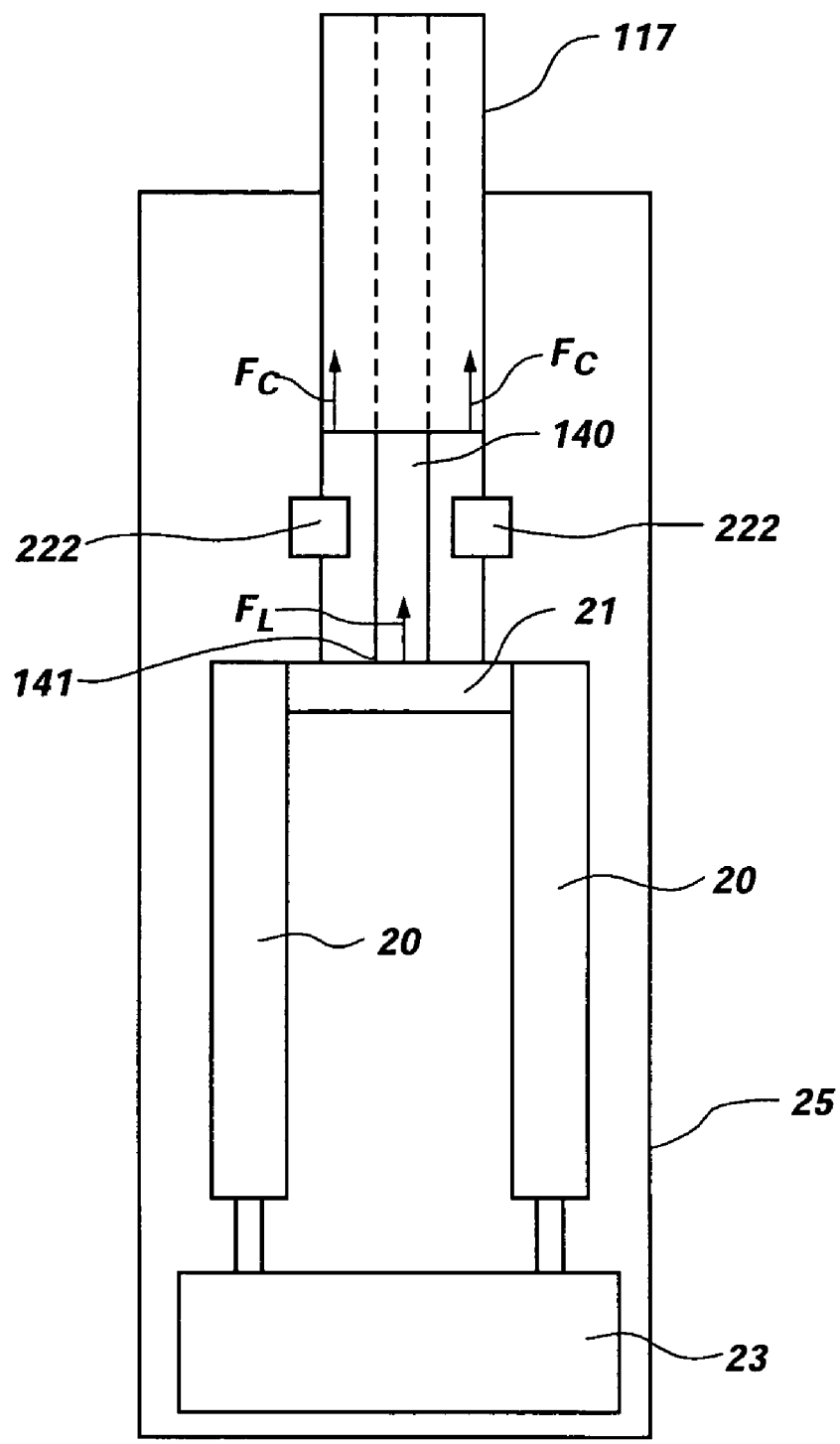
FIG. 2E shows a top elevation view of a pipe jacking assembly of the present invention including limiting members.

In another exemplary embodiment, the force applied to a microtunneling machine 18 tunneling into subterranean formation 180 may be partially transferred through linkage section 140 and in a direction generally toward the cutting structure 116 of microtunneling machine 18. FIG. 2E shows a top elevation of jacking apparatus 11 in relation to casing section 117 and linkage section 140. In addition, force limiting member 222 may mechanically or structurally couple casing section 117 to forcing plate 21. However, force limiting member 222 may be configured for regulating or limiting the magnitude of force $F_C$ applied to casing section 117. For instance, force limiting member 222 may be a pneumatic piston that may be controllably pressurized so as to provide a force $F_C$ between forcing plate 21 and casing section 117. Of course, the force limiting member 222 may be configured to provide a selected maximum magnitude of force $F_C$ between forcing plate 21 and casing section 117, by way of pressure relief (venting) or other mechanisms as known in the art responsive to $F_C$ reaching a threshold magnitude. Alternatively, force limiting member 222 may be a biasing element (i.e., a compression spring or gas-filled piston) which has a length that exceeds the length of the linkage section 140 extending from the casing section 117. Thus, upon positioning the forcing plate 21 against the linkage section 140, the force limiting member 222 (i.e., configured as a spring) may be compressed by forcing plate 21 prior to contact with linkage section 140. Thus, in such a configuration, the magnitude of force $F_C$ that is transmitted through casing section 117 may be selected, adjusted, or otherwise modified for suitable use in combination with a selected casing section 117. Thus, the force limiting member 222 may be configured to provide a substantially constant force between forcing plate 21 and casing section 117, whether configured as a pneumatic piston or a compression spring, without limitation.

Figure 2F:
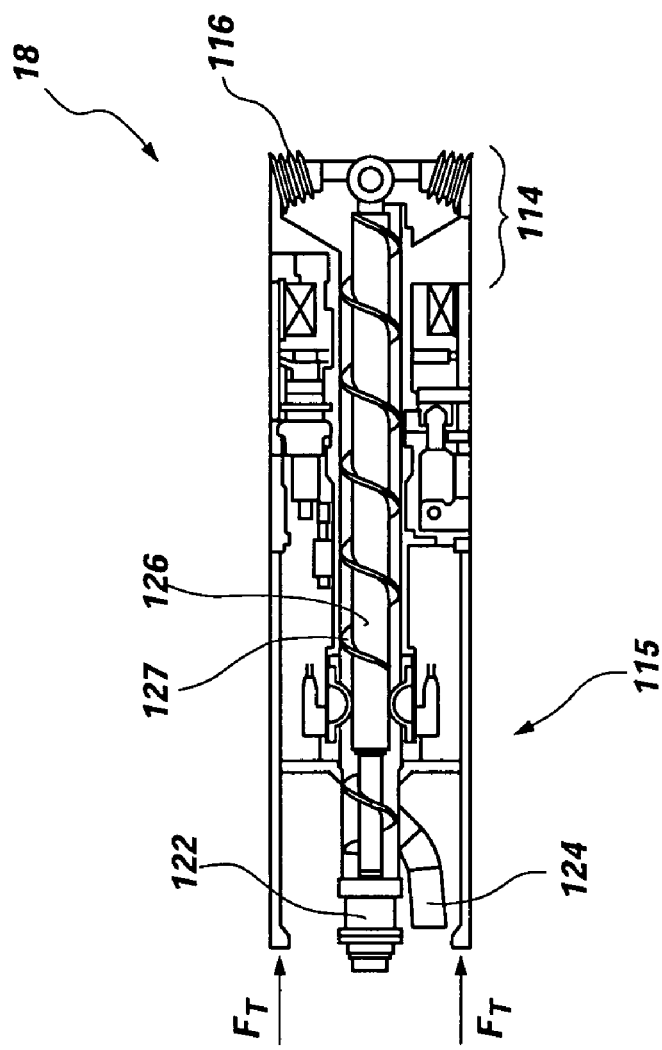
FIG. 2F shows a simplified schematic side cross-sectional view of a pipe jacking assembly of the present invention.
Figure 2F:
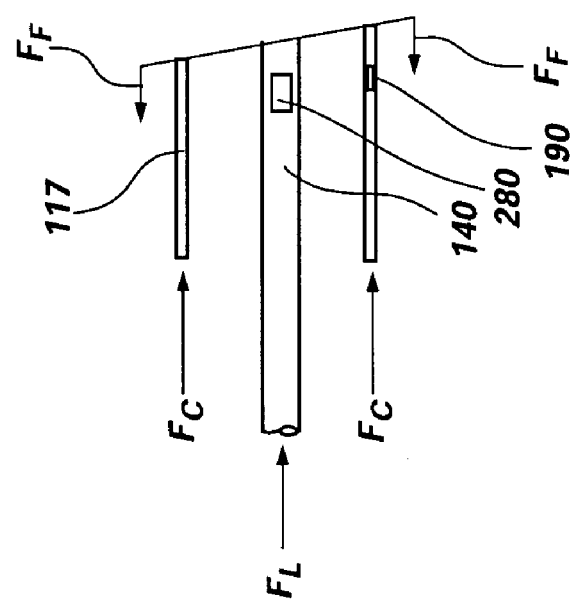

In further detail, FIG. 2F shows a simplified schematic side cross-sectional view of microtunneling machine 18, and the longitudinally most distal at least one linkage section 140 and at least one casing section 117, both of which may be affixed to microtunneling machine 18. Conceptually, force $F_T$ applied to microtunneling machine 18 may be characterized as the sum of casing force $F_C$ and linkage force $F_L$, wherein the sum is reduced by the frictional force $F_F$ of moving a casing string (not shown) into a formation. Put another way, in relation to the discussion regarding FIGS. 2C and 2D above, jacking force may comprise the sum of casing force $F_C$ and linkage force $F_L$. Thus, relative magnitudes of compression within at least one linkage section 140 and tension or compression within at least one casing section 117 may be selected by adjusting the magnitude of linkage force $F_L$ in relation to casing force $F_C$. For instance, casing force $F_C$ may be substantially zero in the equipment configuration illustrated in FIG. 2D.

However, where the magnitude of frictional force $F_F$ is relatively high, the tensile stress within the at least one casing section 117 may be correspondingly and undesirably high, since $F_L$, used in part to the pull casing sections 117, is also applied such that the force experienced by casing sections 117 therefrom is tensile in nature. Thus, it may be desired to select some magnitude of casing force $F_C$ to be greater than zero to balance against the tensile stress developed within the at least one casing section 117 from frictional drag force $F_F$ in combination with linkage force $F_L$. For instance, the magnitude of casing force $F_C$ may be selected to substantially eliminate tensile stress on the at least one casing section 117 or at least limit the magnitude of tensile stress experienced by the at least one casing section 117. As mentioned above, alternatively, the magnitude of casing force $F_C$ in relation to the magnitude of frictional force $F_L$ may be selectively adjusted by changing the position of affixation of the at least one linkage section 140 to the casing string 157.

More generally, it may be beneficial to regulate, control, or adjust the magnitude of forces or stresses associated with the at least one casing section 117, the at least one linkage section 140, or both. Jacking force, bending stress (due, in part to directional tunneling), formation pressures, or other forces, pressures, thermal stress, or other stress-developing conditions as known in the art may contribute to stress or cause stress to develop within the at least one casing section 117 or the at least one linkage section 140. Therefore, the present invention contemplates that the magnitude of stress or force associated with the at least one linkage section 140, the at least one casing section 117, or both, may be measured. As shown in FIG. 2F, linkage transducer 280 and casing transducer 190 may measure, indicate, or communicate relative magnitudes of stress, force, or both experienced by the at least one linkage section 140 or the at least one casing section 117, respectively. For instance, linkage transducer 280 and casing transducer 190, may comprise, without limitation, one or more of a strain gauge, a piezoelectric transducer, a load cell, or another force or stress measurement device as known in the art. It should be understood that the present invention contemplates that at least one transducer may be provided respectively to at least one of casing section 117 and linkage section 140; therefore, more than one linkage transducer 280 or casing transducer 190 may be provided as desired for monitoring and controlling relative stress or force magnitudes associated with linkage section 140 or casing section 117.

Although the jacking apparatus 11 is shown and described in relation to hydraulic equipment, the present invention is not so limited. Rather, the present invention contemplates that jacking force may be supplied by any conventional jacking or forcing equipment as known in the art. For example, threaded members, gears, or other mechanical systems may be used to deliver force. For instance, percussive force (i.e., by way of impact) may be transmitted through a linkage section 140 of the present invention.

Figure 3A:
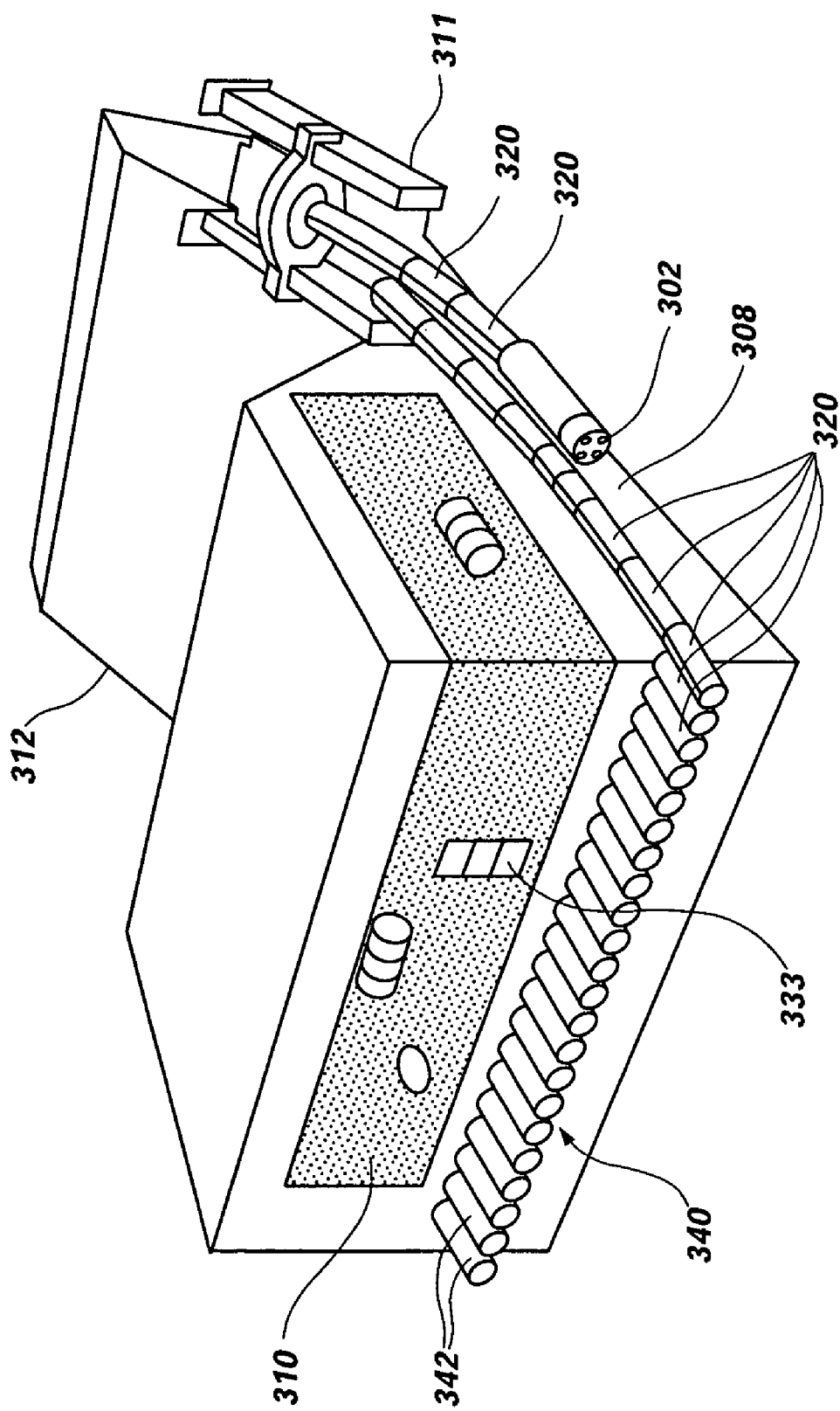
FIG. 3A shows a cut-away perspective view of an exemplary barrier of the present invention formed from a plurality of interlocked casing sections.

Furthermore, the tunneling assembly 200 and tunneling system 210 of the present invention may be particularly useful to form containment structures as disclosed in U.S. Pat. No. 6,575,663 to Kostelnik, et al., as mentioned above. Turning to FIG. 3A, the tunneling system 210 of the present invention may be particularly useful to form containment structures designed to contain buried waste and effluent therefrom generally within a subsurface region 310 of interest. FIG. 3A shows a perspective cut-away view of a barrier 340 which may be formed by the methods of the present invention. More particularly, as shown in FIG. 3A, a pipe jacking apparatus 311 and microtunneling machine 302 may be employed to form a plurality of adjacent casing-lined tunnels underneath a subsurface region 310. Particularly, casing strings 342 comprising a plurality of casing sections 320 affixed to one another in an end-to-end relationship may be disposed within subterranean formation 308, as described in relation to the methods and apparatus of the present invention. Further, the casings strings 342 disposed within the adjacent tunnels may be interlocked to form a subsurface barrier 340.

Preferably, each tunnel may be substantially circular in cross-section. Also, each tunnel may begin in trench or pit 312 and may end in a corresponding trench (not shown) on the other side of subsurface region 310 of interest. Microtunneling machine 302 may be employed to form each tunnel and, according to the present invention, may be employed to pull casing sections 320 thereinto. In a preferred embodiment, casing sections 320 may comprise a polymer, such as PVC, HDPE, polypropylene, or PVDF. However, alternative materials that would provide suitable mechanical properties and durability are contemplated as being within the scope of this invention. Alternative materials comprising at least one casing section 320 may include, but are not limited to, vitrified clay, aluminum, bronze, or steel. It may be noted that the methods of the present invention, while enabling use of casing sections 320 that comprise materials other than steel, may also be used to dispose casing sections 320 comprising steel or other relatively high-strength metal alloys within subterranean formation 308.

Further, as adjacent tunnels may be formed and lined with casing sections 320, each casing section 320 of casing string 342 installed within a tunnel may be interlocked with, along a side wall thereof, an adjacent casing section 320 of a casing string 342 disposed within an adjacent tunnel so that a substantially continuous barrier 340 may be formed. Accordingly, each of casing sections 320 may be interlocked with adjacent casing sections 320 as by complementary interlocking structures. For example, and not by way of limitation, casing sections 320 may comprise interlocking structures as described in U.S. patent application Ser. No. 10/062,817 to Nickelson or Ser. No. 10/358,633 to Nickelson, each of which is assigned to the assignee of the present invention, the disclosures of each of which are incorporated in their entirety by reference herein.

Figure 3B:
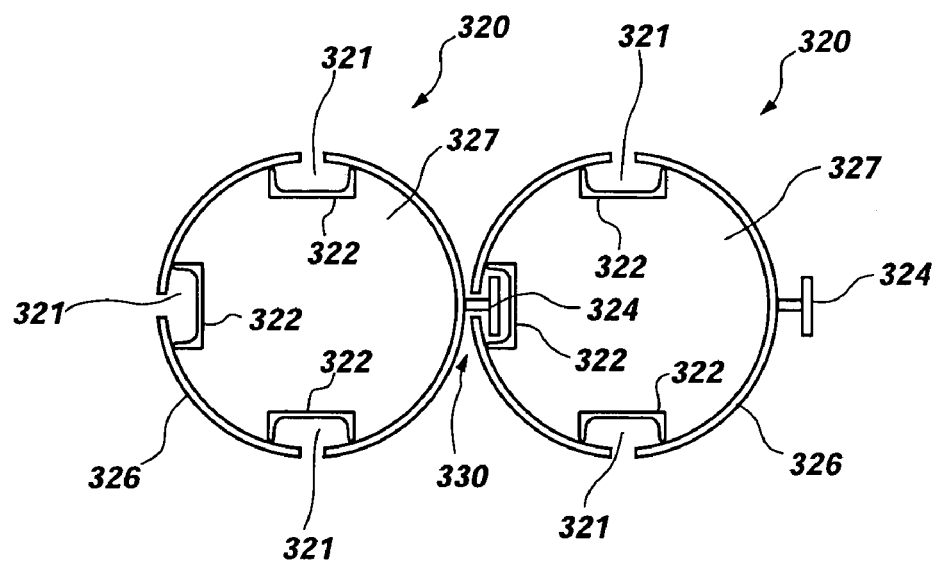
FIG. 3B shows a cross-sectional view of two exemplary, interlocked casing sections.
Figure 3C:
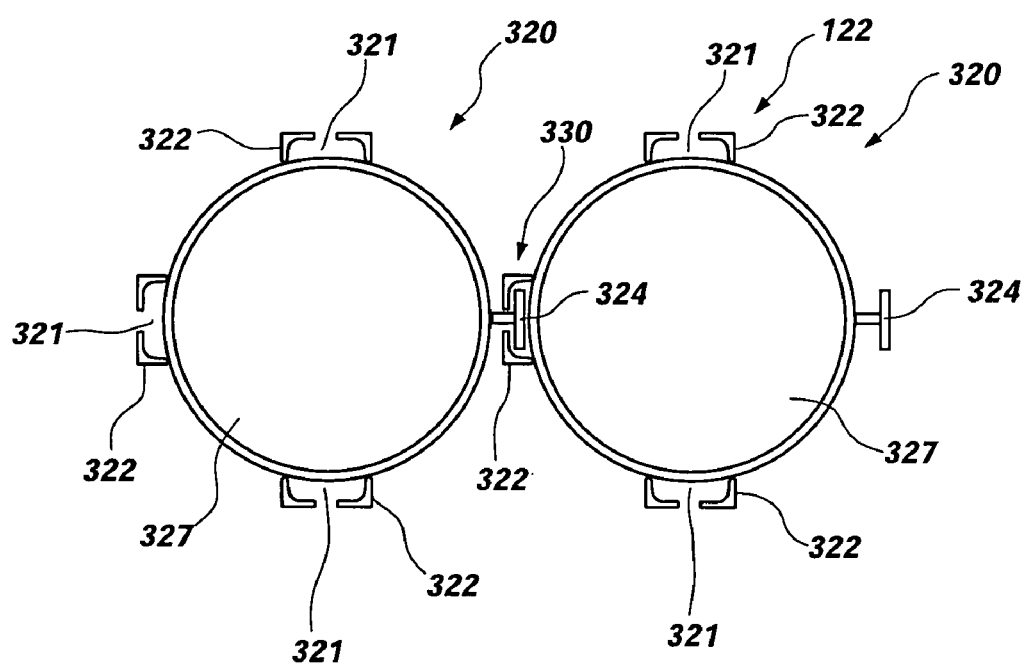
FIG. 3C shows a cross-sectional view of two exemplary, interlocked casing sections.

For instance, as shown in FIG. 3B, each of casing sections 320 may include at least one male interlocking structure 324 and at least one female interlocking structure 322, forming recess 321. Interlocked structure 330 may be formed by a male interlocking structure 324 disposed within an associated female interlocking structure 322. Each of casing sections 320 are shown as including a substantially circular body 326 forming a bore 327, but may comprise other tubular cross-sectional shapes, as known in the art. As shown in FIG. 3B, the at least one male interlocking structure 324 and the at least one female interlocking structure 322 may be disposed within the bore 327 of a casing section 320. Alternatively, as shown in FIG. 3C, an at least one female interlocking structure 322 and an at least one male interlocking structure 324 may be disposed external to the bore 327 of casing section 320. Further, interlocked structure 330 may be formed by a female interlocking structure 322 disposed about an associated male interlocking structure 324. Combinations of internal or external female interlocking structures 322 and male interlocking structures 324 are contemplated by the present invention, without limitation.

As known in the art, casing sections 320 as well as interlocked structures 330 of adjacent casing sections 320, once disposed within formation 308, may be preferably substantially filled (within their bores 327 and recesses 321) with a barrier filler material (not shown) such as grout, cement, concrete, bentonite-based materials, modified cement, polysiloxane, acrylic polymers, or the like. In addition, molten wax or tar may be disposed within casing strings 342 and interlocked structures 330 thereof to form a substantially leak-tight barrier 340 upon solidification or thickening. More generally, barrier filler material comprising a metallic or nonmetallic liquid, gel, slurry, granular material, or other flowable state material (i.e., freely movable) may be disposed within the interlocking structures 330 and, optionally, may be subsequently solidified to form a substantially continuous and leak-tight barrier 340. Also, as known in the art, such barrier filler(s) (not shown) may be disposed within bores 327 of casing sections 320 to produce a barrier 340 that is relatively chemically stable, even when exposed to solutions saturated with calcite, gypsum, and the like.

Such a barrier 340 may be desirable, because barrier 340 may exhibit a high degree of structural continuity and strength. Additionally, barrier 340 may demonstrate a relatively low hydraulic conductivity, which means that barrier 340 may be substantially impermeable to leachate (not shown) of buried waste 333 (FIG. 3A). Barrier 340 may also be thermally stable and may retain its structural integrity and hydraulic conductivity under a wide variety of physical and thermal conditions including ground shifting, and relatively large temperature gradients. Also, barrier 340 may be configured for use in freeze/thaw conditions and conditions where heavy precipitation causes high levels of groundwater flow.

While the present invention has been described herein with respect to certain preferred embodiments, those of ordinary skill in the art will recognize and appreciate that it is not so limited. Rather, many additions, deletions and modifications to the preferred embodiments may be made without departing from the scope of the invention as hereinafter claimed. In addition, features from one embodiment may be combined with features of another embodiment while still being encompassed within the scope of the invention as contemplated by the inventors. Therefore, the invention is to cover all modifications, equivalents, and alternatives falling within the spirit and scope of the invention as defined by the following appended claims.

What is claimed is:

1. A tunneling system for disposing casing sections into a subterranean formation comprising:
    a tunneling apparatus including:
        a leading end comprising a rotatable portion including a cutting structure disposed thereon; and
        a trailing end;
    a casing string comprising at least one casing section, the casing string in structural communication with the tunneling apparatus; and
    at least one linkage section disposed within the casing string, the at least one linkage section in structural communication with the tunneling apparatus;
    an apparatus configured and oriented to apply compressive force to both the at least one casing section and the at least one linkage section;
    wherein the at least one linkage section extends longitudinally away from the cutting structure; and
    wherein the at least one linkage section is sized and configured for transmitting a force to the tunneling apparatus and generally toward the leading end thereof.

2. The tunneling system of claim 1, wherein the tunneling apparatus comprises a microtunneling machine.

3. The tunneling system of claim 1, wherein the at least one casing section comprises a polymer.

4. The tunneling system of claim 3, wherein the at least one casing section comprises at least one of polyvinyl chloride, polypropylene, high density polyethylene, and polyvinylidene fluoride.

5. The tunneling system of claim 1, wherein the at least one casing section comprises a plurality of casing sections, wherein each adjacent casing section is affixed to at least another adjacent casing section in an end-to-end relationship.

6. The tunneling system of claim 5, wherein the at least one linkage section comprises a plurality of linkage sections, wherein each adjacent linkage section is affixed to at least another adjacent linkage section in an end-to-end relationship.

7. The tunneling system of claim 6, wherein more than one of the plurality of linkage sections includes a respective force transmitting member.

8. The tunneling system of claim 7, wherein more than one of the plurality of casing sections includes an engagement feature which is sized, positioned, and configured for engagement with the force transmitting member of the more than one of the plurality of linkage sections responsive to movement of the plurality of linkage sections generally toward the leading end of the tunneling apparatus.

9. The tunneling system of claim 8, wherein each force transmitting member of the more than one of the plurality of linkage sections is configured to engage the engagement feature of one of the more than one of the plurality of casing sections substantially simultaneously.

10. The tunneling system of claim 1, wherein the at least one linkage section comprises a plurality of linkage sections, wherein each adjacent linkage section is affixed to at least another adjacent linkage section in an end-to-end relationship.

11. The tunneling system of claim 10, wherein one of the plurality of linkage sections is affixed to a force transmitting member.

12. The tunneling system of claim 11, wherein the force transmitting member is longitudinally positioned between the plurality of linkage sections and the tunneling apparatus.

13. The tunneling system of claim 11, wherein the at least one linkage section is affixed to the force transmitting member by at least one of welding, threaded connection, hinged connection and at least one mechanical fastener.

14. The tunneling system of claim 1, wherein the at least one casing section comprises at least one of aluminum, bronze, clay, steel, polyvinyl chloride, polypropylene, high density polyethylene, polyvinylidene fluoride, and concrete.

15. The tunneling system of claim 14, further comprising a coating disposed on an interior surface or an exterior surface of the at least one casing section.

16. The tunneling system of claim 1, wherein the at least one casing section comprises a composite including a matrix and at least one strengthening constituent dispersed therein.

17. The tunneling system of claim 1, wherein the at least one casing section comprises a laminated structure including a plurality of radially arranged layers which are mutually bonded to one another.

18. The tunneling system of claim 1, wherein the apparatus comprises a pipe jacking apparatus configured to apply a net compressive force to the at least one linkage section and a net compressive force to the at least one casing section.

19. The tunneling system of claim 1, wherein the apparatus comprises a pipe jacking apparatus configured to apply a net compressive force to the at least one linkage section and a net tensile force to the at least one casing section.

20. The tunneling system of claim 19, further comprising at least one force limiting member disposed between the forcing plate and the casing string.

21. The tunneling system of claim 20, wherein each of the at least one force limiting member comprises at least one of a biasing element and a pneumatic piston.

22. The tunneling system of claim 1, wherein the at least one linkage section includes structure for controllably securing and releasing the at least one linkage section with respect to the casing string.

23. The tunneling system of claim 22, wherein the structure for controllably securing and releasing the at least one linkage section comprises an expandable, force transmitting member.

24. The tunneling system of claim 1, wherein each of the at least one casing section includes at least one male interlocking structure and at least one female interlocking structure adjacent a side wall thereof.

25. The tunneling system of claim 1, further comprising a transducer for measuring a force acting on at least one of the at least one casing section and the at least one linkage section.

26. The tunneling system of claim 1, further comprising a transducer for measuring a stress acting on at least one of the at least one casing section and the at least one linkage section.

27. The tunneling system of claim 1, wherein the casing string is sized and configured to transmit a portion of the force without failure in combination with transmission of another portion of the force via the at least one linkage section.

28. A method of disposing a casing string within a subterranean formation, comprising:
    providing a tunneling apparatus configured with a trailing end and a leading end, wherein the leading end comprises a cutting structure disposed thereon;
    providing a casing string comprising at least one casing section in structural communication with the trailing end of the tunneling apparatus;
    providing at least one linkage section extending longitudinally through the at least one casing section and structurally communicating with the trailing end of the tunneling apparatus;
    applying a force generally to the trailing end of the tunneling apparatus, generally toward the leading end thereof, wherein at least a portion of the force is applied through the at least one linkage section;
    applying a compressive force to an end of the casing string remote from the tunneling apparatus; and
    tunneling into a subterranean formation with the cutting structure of the tunneling apparatus.

29. The method of claim 28, further comprising affixing a force transmitting member to the casing string.

30. The method of claim 29, wherein affixing the force transmitting member to the casing string comprises selectively affixing the force transmitting member to the casing string.

31. The method of claim 30, further comprising:
    releasing the force transmitting member from the casing string;
    moving the force transmitting member relative to the casing string; and
    reaffixing the force transmitting member to the casing string.

32. The method of claim 28, wherein applying the force generally toward the leading end of the tunneling apparatus comprises applying a force through the at least one linkage section that is greater than the compressive force applied to the end of the casing string remote from the tunneling apparatus.

33. The method of claim 32, wherein applying the force generally toward the leading end of the tunneling apparatus comprises applying a percussive force.

34. The method of claim 28, wherein providing at least one linkage section comprises:
    providing a plurality of linkage sections; and
    securing each linkage section to at least another linkage section in an end-to-end relationship.

35. The method of claim 34, wherein providing a casing string comprises:
    providing a plurality of casing sections; and
    securing each casing section to at least another casing section in an end-to-end relationship.

36. The method of claim 28, further comprising measuring a magnitude of a force transmitted through at least one of the casing string and the at least one linkage section.

37. The method of claim 36, further comprising adjusting the magnitude of the force transmitted through at least one of the casing string and the at least one linkage section in response to the measured magnitude of the the force transmitted through at least one of the casing string and the at least one linkage section.

38. The method of claim 28, wherein applying the force generally toward the leading end of the tunneling apparatus comprises applying a tensile force to the at least one casing section.

39. The method of claim 38, wherein applying a tensile force to the at least one casing section comprises applying a tensile force to the at least one casing section that is greater than the compressive force applied to the end of the casing string remote from the tunneling apparatus.

40. The method of claim 28, further comprising limiting a difference between a magnitude of the portion of the force applied through the at least one linkage section and a magnitude of the compressive force applied to the end of the casing string remote from the tunneling apparatus.

41. The method of claim 28, further comprising measuring a difference between a magnitude of the portion of the force applied through the at least one linkage section and a magnitude of the compressive force applied to the end of the casing string remote from the tunneling apparatus.

42. The method of claim 41, further comprising adjusting the difference between the magnitude of the portion of the force applied through the at least one linkage section and the magnitude of the compressive force applied to the end of the casing string remote from the tunneling apparatus in response to measuring the difference.

43. The method of claim 42, wherein adjusting the difference comprises adjusting the magnitude of the portion of the force applied through the at least one linkage section.

44. The method of claim 28, further comprising substantially filling an interior of the casing string with a barrier filler comprising at least one of cement, concrete, bentonite, polysiloxane, acrylic polymers, wax, and tar.

45. The method of claim 28, further comprising interlocking the casing string affixed to the trailing end of the tunneling apparatus to an adjacent casing string.

46. The method of claim 45, wherein interlocking comprises disposing at least one of a male interlocking structure and a female interlocking structure of the casing string into cooperative engagement with at least one of a female interlocking structure and a male interlocking structure of the adjacent casing string, respectively.

47. A method of disposing a casing string within a subterranean formation comprising:
   providing a tunneling apparatus configured with a trailing end and a leading end, wherein the leading end comprises a cutting structure disposed thereon;
   providing a casing string comprising at least one casing section and configuring the casing string to be in structural communication with the trailing end of the tunneling apparatus;
   applying a force generally to the trailing end of the tunneling apparatus, generally toward the leading end thereof, through a linkage extending longitudinally within and affixed directly to the casing string; and
   tunneling into a subterranean formation with the cutting structure of the tunneling apparatus.

48. A method of disposing a casing string within a subterranean formation, the method comprising:
   drilling a borehole through the subterranean formation while substantially simultaneously pulling a casing string through the borehole from a location adjacent a leading end of the borehole and pushing the casing string through the borehole from a location remote from the leading end of the borehole.

49. The method of claim 48, further comprising applying a net tensile force to the casing string.

50. The method of claim 48, further comprising applying a net compressive force to the casing string.

51. The method of claim 48, further comprising limiting a net force applied to the casing string.

* * * * *